Dec. 24, 1968    L. J. WRONKE ETAL    3,417,731
ROTATABLE INDICATOR ASSEMBLY
Filed April 21, 1966
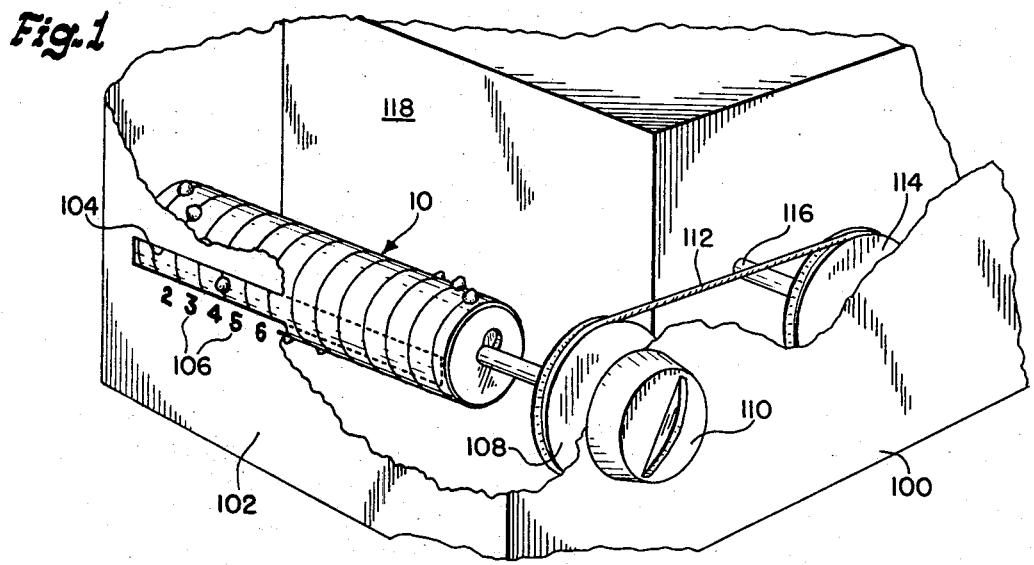
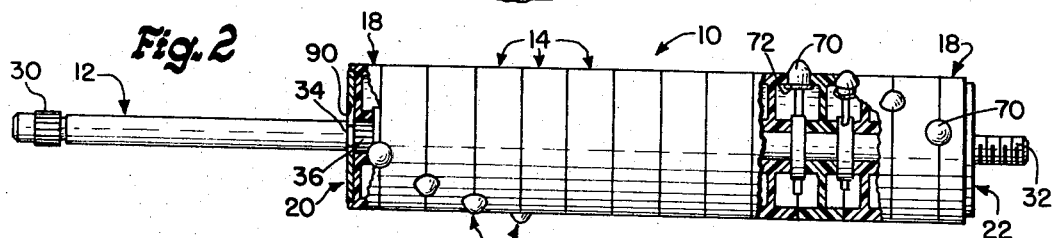
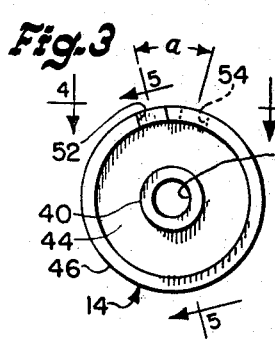
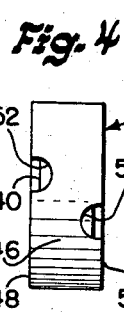
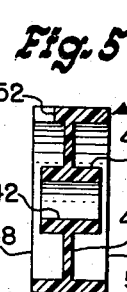
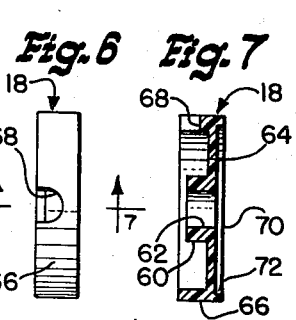
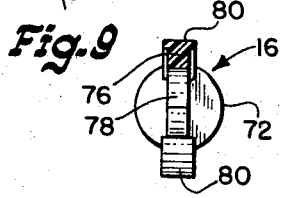
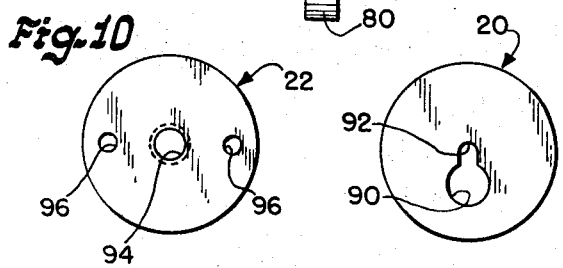
INVENTORS
Edwin Grant Swick
Louis John Wronke
BY
Their Att'ys

# United States Patent Office 3,417,731
Patented Dec. 24, 1968

3,417,731
ROTATABLE INDICATOR ASSEMBLY
Louis J. Wronke, Hillpoint, Wis., and Edwin Grant Swick, Bartlett, Ill., assignors to Illinois Tool Works Inc., Chicago, Ill., a corporation of Delaware
Filed Apr. 21, 1966, Ser. No. 544,310
11 Claims. (Cl. 116—124.1)

ABSTRACT OF THE DISCLOSURE

A rotatable indicator assembly of a plurality of spacer means and indicia means mounted on a shaft in fixed axial and angular relationship to the shaft, the indicia means defining a fixed helix on an imaginary cylinder coaxial with the shaft. The device is suitable for use with television sets requiring a fixed angular movement to control a tuner and to indicate the channel with which the tuner is aligned.

---

This invention relates to indicia means for indicating the angular position of an incrementally rotatable means. More particularly, it relates to the display of separate discrete indicia means in an elongated slot-like calibrated window to indicate the position of a channel tuning device in a television receiver.

In the electronics trades the trend has been toward compactness of components. The problems of indicating, precisely, the angular rotation of such components has led to devices such as the present invention in which the angularly disposed indicia means are also spaced axially whereby the indicia means are disposed on a helix superimposed on a cylinder. In addition to compactness, the electronics trade has demanded that such indicators be structurally stable within certain temperature ranges due to the thermal characteristics of certain components.

It is an object, therefore, of the present invention to provide a compact, structurally stable assembly of indicia means which are designed to indicate the angular position of an incrementally rotatable means.

A further object of the present invention is to provide an indicator assembly which is comprised of a plurality of interchangeable components which will maintain the degree of accuracy required in the end product.

Still another object of the present invention is to provide an indicator assembly which is capable of being economically fabricated and assembled.

Other objects of the invention will become apparent to those skilled in the art when the specification is read in the light of the accompanying drawings wherein:

FIG. 1 is a perspective view in partial section of an embodiment of the present invention in its finally mounted position;

FIG. 2 is an elevational view in partial section showing the various components making up the indicator assembly;

FIG. 3 is an end view in elevation of a locating and spacing means or wheel of the type contemplated by the present invention and used in the assembly shown in FIG. 2;

FIG. 4 is a side view in elevation of the same wheel taken along lines 4—4 in FIG. 3;

FIG. 5 is an elevational view in section as taken along line 5—5 of FIG. 3;

FIG. 6 is a side elevational view of an end cap of the type contemplated in the present invention;

FIG. 7 is an elevational view in section taken along line 7—7 of the end cap shown in FIG. 6;

FIG. 8 is a side view in elevation of an indicator button which serves as the indicia means in this assembly;

FIG. 9 is an end view in partial section of the indicator button shown in FIG. 8 as taken along line 9—9 of FIG. 8;

FIG. 10 is a plan view of locking means for restraining one end of the assembly; and FIG. 11 is the locking spacer means adapted to be utilized at the opposite end of the assembly.

A rotatable indicator assembly 10 of the type contemplated by the present invention broadly includes a shaft 12, a plurality of spacer wheels 14, a plurality of indicia means 16, end cap 18 and locking means 20 and 22.

The elongated shaft 12 may be of any desired cross-sectional configuration but in the preferred embodiment is cylindrical. At one end it is provided with means for assuring rotation such as splines 30 and at the opposite extremity it is threaded as indicated by the numeral 32. Intermediate its extremities and at a predetermined point spaced axially from said extremities is a locating means 34 which in the present embodiment is a groove of reduced diameter relative to the principal diameter of shaft 12. Adjacent groove 34 the shaft 12 is provided with means for imparting rotation to the remainder of the assembly. In the preferred embodiment the shaft 12 has splines 36 which project above the normal diameter of the shaft for purposes set forth hereinafter.

Mounted on and spaced axially along shaft 12 between the groove 34 and threads 32 are a plurality of locating and spacer means or wheels 14. The wheels 14 are all substantially identical to facilitate their assembly on shaft 12. In the preferred embodiment wheels 14 are generally in the shape of a wheel having a hub 40 with a through-bore 42 complementary to the shaft 12. Web means 44 extend radially from hub 40 and support the outer rim 46. The oppositely facing axially spaced edges 48–50 of rim 46 are notched to provide slots 52–54 in angular spaced relation relative to the axis of wheel 14 by an angle $a$, as shown in FIG. 3, for purposes best set forth hereinafter. As can be seen in FIG. 5 the hub 40 is of lesser axial extent than the rim 46 and is spaced from the end edges 48–50 by a predetermined amount.

The end caps 18 are similar to the spacing wheels 14 in that they include a hub 60 having a bore 62, complementary to shaft 12, web means 64 and an outer rim 66. The rim 66 differs from rim 46 in that it has only one locating means such as slot 68. Additionally, the hub 60 extends in only one direction from web 64 while the rim 66 projects beyond hub 60 in the same direction but is foreshortened in its axial extension in the opposite direction with edge 70 of the rim 66 forming a shallow recess 72 for purposes best set forth hereinafter.

Referring now to FIGS. 8 and 9, the indicia means 16 includes an indicator button 70 which in the preferred embodiment is circular in cross section and generally bullet shaped in axial section. Indicator button 70 is substantially complementary through fifty percent of its transverse section with the slots 52, 54 and 68. Button 70 is attached by a shank 74 to a hub 76, with hub 76 having a through bore 78 substantially complementary to shaft 12. For purposes best set forth hereinafter, the hub 76 has a discontinuous, axially extending rim 80 which is segmental between the lateral extremities of shaft 74 and its appendage 82. The diametral spacing between the opposed segments of rim 80 is controlled so that the distance between the opposed inner faces of rim 80 are substantially complementary to the outer dimension of hubs 40 and 60 for purposes set forth hereinafter.

To assemble a rotatable indicator of the type contemplated by this invention the shaft 12 is supported in suitable fixturing, not shown, at the splined end 30. Means such as washer 20 having an off-center aperture 90 with a keyhole slot 92 communicating with aperture 90 is moved axially down the shaft. Aperture 90 is complementary to shaft 12 and keyhole slot 92 is complementary to groove 34 whereby when the washer 20 is moved laterally transverse to the axis of shaft 12 the slot 92 is seated in groove 34 and washer 20 is restrained against axial movement relative to shaft 12. An end cap 18 is then mounted on shaft 12 through its bore 62 until it reaches the splined portion 36 whence it is forced in the direction of end 30 whereby the splines 36 bite into and cut making axial grooves in the bore 62 of hub 60. The axial movement is continued until washer 20 is seated within cavity 72 of end cap 18. One of the indicia means 16 is then mounted on shaft 12 with shaft 12 being telescopically associated with bore 78 of indicia means 16. Means 16 is moved axially and rotationally positioned until the button 70 falls within slot 68 of end cap 18 and hub 76 is brought into intimate contact with hub 60, the segmental rim 80 overlying and embracing hub 60 to accurately position the shaft 74 and its button 70 in a truly radial relationship to shaft 12. At this point a spacing wheel 14 is telescoped onto shaft 12 through the complementary bore 42 in its hub 40. It is moved axially and rotationally aligned until slot 52 in rim 46 is brought into complemental relationship with the other half of button 70. The edge 48 of rim 46 is positioned in abutting relationship to the edge of rim 66 in end cap 18 and the projection of hub 40 facing in the same direction as notch 52 is seated within the segmental rim 80 and abuts hub 76 of the indicia means 16. It will be noted in FIG. 2 that the indicator button 70 has an axial dimension sufficient to permit at least the bullet-nosed portion thereof to extend radially outwardly beyond the outer surface of rim 46 with the flange 72 underlying the inner surface of rim 46. Flange 72 is tapered, as shown in FIG. 8 in such a fashion that it will insure the accurate positioning of the indicia means 16 in cooperation with the segmental rim portions 80 which engage hub 40 of the spacing wheels 14.

Following the placement of spacing wheels 14 adjacent end cap 18 additional indicia means 16 and spacing wheels 14 are telescoped with shaft 12 and brought into intimate engagement with one another in sequential fashion. In the illustrated embodiment of this invention the angle is approximately 27 degrees, 41 minutes and 32 seconds since it is designed for use with a thirteen channel television tuner. The specific angularity of angle $a$ can be varied in any given instance and is controlled solely by the total number of angular increments desired to be indicated. When the total number of predetermined indicia means 16 and spacing means 14 have been telescoped with shaft 12 a second end cap 18 is telescoped with shaft 12 through its bore 62 with slot 68 being brought into embracing relationship with the last button 70. Spanner nut 22 having a centrally threaded aperture 94 and wrench engaging means 96 engages screw threaded end 32 and is rotated thereon until it is moved axially into position within the cavity 72 in end cap 18. If desired, but not shown, a lockwasher may be introduced between spanner nut 22 and end cap 18 to prevent retrograde rotation of the spanner nut 22.

A rotatable indicator assembly 10 of the type previously described is generally mounted within a cabinet 100 in parallel relationship to its front panel 102. Panel 102 is provided with an elongated slot 104 parallel to the axis of shaft 12 and parallel to the cylindrical configuration formed by the mating outer surfaces of rims 46 of spacer wheels 14. Suitable indicia means 106 are provided in spaced relation along slot 104 to indicate the relationship of indicia means 16. The splined end 30 of shaft 12, in the illustrated embodiment, engages drive wheel 108 on the interior of the cabinet 100 and is suitably interconnected to knob 110 on the exterior of the cabinet. Drive wheel 108 is further connected by suitable means such as a belt 112 to a second sheave or drive wheel 114 attached to shaft 116 projecting from the incrementally rotatable means housed in a box 118, such as a television tuner assembly. Thus, rotation of knob 110 results in an incremental rotation of both the television tuner shaft 116 and the indicator assembly 10 resulting in the positioning of indicia means 16 in sequential relationship opposite the viewing slot 104 and its associated calibrated means 106. Obviously, to insure positive incremental rotation of drive wheels 108 and 114 relative to each other, it would be necessary for belt 112 to be equipped with teeth or other means, not shown, to positively engage each of said drive wheels.

In the preferred embodiment the shaft 12 is preferably metallic in nature although certain rigid plastic materials may also be used. The spacing wheels 14 and indicia means 16 are preferably injection molded of plastic materials capable of maintaining a stable relationship as to size under the temperature requirements found in the interior of the environment to which it is subjected. The washer 20 and spanner nut 22 lock the assembly against axial movement relative to the shaft while splines 36 engaging the bore 62 of the end cap 18 coupled to the interlocking relationship between slots 52, 54 and 68 when occupied by indicator buttons 70 insure positive rotation of the assembly in all incremental angular rotations of shaft 12. The device is easily assembled since wheels 14 can be telescoped with shaft 12 in either axial direction and orientation of parts is only necessary in the case of the end caps 18.

While only a single embodiment of the invention has been set forth hereinabove, other embodiments will be apparent to those skilled in the art and it is our intent that we be limited only by the appended claims. We claim:

1. An indicating member including a shaft, an assembly on said shaft including a plurality of discrete indicia means mounted relative to said shaft in fixed axially and angularly spaced relation, a plurality of wheel-like spacer means mounted on said shaft each having spaced oppositely extending edges in abutting relationship to the next adjacent spacer means, said spacer means mounted in alternating sequential arrangement with said indicia means on said shaft, said spacer means each having fixed locating means on said opposite edges angularly spaced from one another and adapted to complementarily accept portions of one of said indicia means between adjacent spacer means to restrain said indicia means and the adjacent pair of spacer means against relative axial and angular motion, means on said shaft for engaging at least one of said spacer means to induce rotation of said assembly when said shaft is rotated, means cooperable with said shaft and said assembly to restrict axial motion therebetween, a linear means disposed parallel to and spaced from the axis of said shaft and adapted to register with said indicia means to indicate the angular position of said shaft.

2. A device of the type claimed in claim 1 wherein said linear means is a masking device having a linear slot disposed parallel to and spaced from the axis of said shaft, means dividing said slot into uniform increments whereby predetermined angular rotation of said shaft will position a predetermined indicia means in registry with said slot at a predetermined increment intermediate its length.

3. A device of the type claimed in claim 1 wherein said spacer means each include a hub and a cylindrical rim supported in radially spaced relation to said hub, at least one margin of said rim being notched to form said locating means, the notches in the rims of adjacent spacer means being positioned so as to be directly opposite one another and to complementally accept said indicia means within said notches.

4. A device of the type claimed in claim 1 wherein said indicia means are substantially equally spaced from each other both axially and angularly whereby a line passing through said angularly arranged and axially spaced indicia means defines a constant lead helix.

5. A device of the type claimed in claim 4 wherein said indicia means are each sequentially aligned with a fixed line parallel to the axis of said shaft during rotation of less than one revolution of said shaft.

6. A device of the type claimed in claim 3 wherein said discrete indicia means are each an individual button with the extremity of said buttons falling on a developed cylinder radially spaced from and coaxial with said shaft.

7. A device of the type claimed in claim 1 wherein said indicia means are each discrete and individually mounted on said shaft, said plurality of spacer means being substantially identical, at least one of said spacer means being mounted on said shaft between each adjacent pair of indicia means.

8. A device of the type claimed in claim 1 wherein said spacer means each includes a hub having a bore complementary to said shaft, a rim supported in radially spaced relation to said hub, said rim having an axial extent greater than said hub, said rim having notch means forming said locating means on opposite edges of said rim in predetermined fixed angular relationship adapted to coperate with a pair of adjacent indicia means to maintain said indicia means in predetermined fixed axial and angular spaced relation.

9. A device of the type claimed in claim 8 wherein the extremity of said indicator button is radially spaced from said shaft a distance greater than the radius of said rim of said spacer means whereby said indicator button projects as a protuberance on said indicator assembly.

10. A rotatable indicator means for indicating a plurality of angularly related positions including:
 (a) shaft means,
 (b) a plurality of spacing means mounted on said shaft and each having locating means,
 (c) a plurality of indicia means individually mounted on said shaft and adapted to cooperate with said locating means in a manner to cause said indicia means to be axially and angularly spaced relative to said shaft,
 (d) said indicia means including an annular hub having an aperture adapted to be complementarily telescoped on said shaft and radially extending means integral with said hub and terminating in an indicator button,
 (e) said hub having a predetermined axial extent and said indicator button having a transverse section greater in dimension than the axial extent of said hub,
 (f) said spacing means including a hub of predetermined axial extent adapted to be complementarily telescoped on said shaft,
 (g) an annular rim radially spaced from said hub and attached thereto by suitable means, said rim having an axial extent greater than the hub with which it is associated,
 (h) means on opposite edges of said annular rim adapted to complementarily accept a portion of the indicator buttons positioned adjacent thereto,
 (i) said indicia means and spacing means being alternately mounted on said shaft with the means on the rims of adjacent spacing means adapted to totally embrace the indicator buttons on the indicia means whereby opposed edges of adjacent spacing means are positioned in abutting juxtaposed relationship with the means on the rims of adjacent spacing means locking said indicator buttons of the indicia means against movement relative thereto,
 (j) a pair of end cap means positioned at opposite extremities of said plurality of spacing and indicia means,
 (k) restraining means adapted to cooperate with means on said shaft for maintaining said indicia means and said spacing means in fixed spaced axial and angular relation to said shaft, whereby said indicia means are located on a helix radially spaced about said shaft on an imaginary developed cylinder.

11. A device of the type claimed in claim 10, wherein,
 (a) said shaft is provided with an annular groove intermediate its extremities,
 (b) an annul disc having a keyhole slot and adapted to be mounted perpendicularly to said shaft in said groove, said annular disc adapted to act as an axial abutment against which said spacer and indicia means collectively abut to prevent axial movement relative to said shaft in one axial direction,
 (c) said shaft being provided with means adjacent said groove adapted to complementarily engage said spacer means for positive rotation of said spacer and indicia means upon rotation of said shaft,
 (d) secondary restraining means positioned on said shaft in spaced relation to said groove mounted disc to restrain axial movement of said spacer and indicia means in the opposite axial direction.

References Cited

UNITED STATES PATENTS

| | | | |
|---|---|---|---|
| 1,049,636 | 1/1913 | Abernethy | 200—8 |
| 2,712,642 | 7/1955 | Jennings | 200—56 XR |
| 2,756,293 | 7/1956 | Bitler. | |
| 3,149,607 | 9/1964 | Joseph et al. | 116—133 XR |
| 3,169,331 | 2/1965 | Herster | 116—133 |

LOUIS J. CAPOZI, *Primary Examiner.*

U.S. Cl. X.R.

116—116; 200—8; 84—96